United States Patent
Shreve et al.

(10) Patent No.: US 9,390,328 B2
(45) Date of Patent: Jul. 12, 2016

(54) STATIC OCCLUSION HANDLING USING DIRECTIONAL PIXEL REPLICATION IN REGULARIZED MOTION ENVIRONMENTS

(71) Applicant: Xerox Corporation, Norwalk, CT (US)

(72) Inventors: Matthew Adam Shreve, Tampa, FL (US); Qun Li, Webster, NY (US); Edgar A. Bernal, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 14/262,276

(22) Filed: Apr. 25, 2014

(65) Prior Publication Data

US 2015/0310273 A1    Oct. 29, 2015

(51) Int. Cl.
| | | |
|---|---|---|
| G06K 9/00 | (2006.01) | |
| G06K 9/52 | (2006.01) | |
| G06T 7/00 | (2006.01) | |
| G06K 9/46 | (2006.01) | |
| G06T 7/20 | (2006.01) | |

(52) U.S. Cl.
CPC .............. *G06K 9/00624* (2013.01); *G06K 9/46* (2013.01); *G06K 9/52* (2013.01); *G06T 7/004* (2013.01); *G06T 7/20* (2013.01); *G06K 2009/4666* (2013.01)

(58) Field of Classification Search
CPC ................. G06K 2009/4666; G06K 9/00624; G06K 9/46; G06K 9/52; G06T 7/004; G06T 7/20
See application file for complete search history.

(56) References Cited

U.S. PATENT DOCUMENTS

| | | | | |
|---|---|---|---|---|
| 7,929,804 | B2 * | 4/2011 | Avidan | G06T 7/2046 345/427 |
| 8,284,238 | B2 * | 10/2012 | Stone | G06T 7/0044 348/46 |
| 2007/0122000 | A1 * | 5/2007 | Venetianer | G06K 9/00771 382/103 |
| 2009/0002489 | A1 | 1/2009 | Yang et al. | |
| 2012/0106785 | A1 * | 5/2012 | Karafin | G06T 11/00 382/103 |
| 2012/0163658 | A1 * | 6/2012 | Pakulski | G06T 7/2053 382/103 |
| 2013/0058523 | A1 | 3/2013 | Wu et al. | |
| 2013/0076913 | A1 | 3/2013 | Xu et al. | |
| 2013/0088600 | A1 | 4/2013 | Wu et al. | |
| 2013/0106595 | A1 | 5/2013 | Loce et al. | |
| 2013/0278767 | A1 | 10/2013 | Bernal et al. | |
| 2014/0063263 | A1 | 3/2014 | Bernal et al. | |

OTHER PUBLICATIONS

U.S. Appl. No. 14/195,036, filed Mar. 3, 2014, Li et al.
U.S. Appl. No. 14/171,022, filed Feb. 3, 2014, Schweid et al.
U.S. Appl. No. 14/089,887, filed Nov. 26, 2013, Bernal et al.
U.S. Appl. No. 14/078,765, filed Nov. 13, 2013, Bernal et al.
U.S. Appl. No. 14/050,041, filed Oct. 9, 2013, Bernal et al.

(Continued)

*Primary Examiner* — Tom Y Lu
(74) *Attorney, Agent, or Firm* — Fay Sharpe LLP (57) ABSTRACT

This disclosure provides a static occlusion handling method and system for use with appearance-based video tracking algorithms where static occlusions are present. The method and system assumes that the objects to be tracked move in according to structured motion patterns within a scene, such as vehicles moving along a roadway. A primary concept is to replicate pixels associated with the tracked object from previous frames to current or future frames when the tracked object coincides with a static occlusion, where the predicted motion of the tracked object is a basis for replication of the pixels.

25 Claims, 8 Drawing Sheets

(56) References Cited

OTHER PUBLICATIONS

U.S. Appl. No. 14/017,360, filed Sep. 4, 2013, Bernal et al.
U.S. Appl. No. 13/718,030, filed Dec. 18, 2012, Bernal et al.
Azari, M.; Seyfi, A.; Rezaie, A.H., "Real Time Multiple Object Tracking and Occlusion Reasoning Using Adaptive Kalman Filters", Machine Vision and Image Processing (MVIP), 2011, 7th Iranian, pp. 1-5, Nov. 16-17, 2011.
Jiyan Pan; Bo Hu, "Robust Occlusion Handling in Object Tracking", Computer Vision and Pattern Recognition, 2007, CVPR '07, IEEE Conference, pp. 1-8, Jun. 17-22, 2007.
Gwo-Cheng Chao; Shyh-Kang Jeng; Shung-Shing Lee, "An improved occlusion handling for appearance-based tracking", Image Processing (ICIP), 2011 18th IEEE International Conference, pp. 465-468, Sep. 11-14, 2011.
Steven W. Smith, Ph.D., "Special Imaging Techniques", The Scientist and Engineer's Guide to Digital Signal Processing, chapter 25, pp. 423-450, copyright 1997-2011 by California Technical Publishing.
"Kalman filter", Wikipedia, http://en.wikipedia.org/wiki/Kalman_filter, 26 pages, printed Mar. 7, 2014.

U. Castellani, S. Livatino, and R. Fisher, "Improving environment modelling by edge occlusion surface completion," International Symposium on 3D Data Processing Visualization and Transmission, 2002.
C. L. Zitnick and T. Kanade, "A cooperative algorithm for stereo matching and occlusion detection," Proc. IEEE Trans. Pattern Analysis and Machine Intelligence, vol. 22, 2000.
L'Evesque and F. Deschênes, "Detection of Occlusion Edges from the Derivatives of Weather Degraded Images," Proc. of the Second Canadian Conference on Computer and Robot Vision, pp. 114-120, 2005.
J. Konrad and M. Ristivojevi. "Video segmentation and occlusion detection over multiple frames," IS&T/SPIE Symposium on Electronic Imaging, Image and Video Communications, 2003.
Jackson, B.; Bodor, R.; Papanikolopoulos, N., "Learning static occlusions from interactions with moving figures," Intelligent Robots and Systems, 2004. (IROS 2004). Proceedings. 2004 IEEE/RSJ International Conference, pp. 963,968 vol. 1, Sep. 28-Oct. 2, 2004.
Miller, G.; Atev, S.; Papanikolopoulos, N., "Detecting static occlusion edges using foreground patterns," Control and Automation, 2009. MED '09. 17th Mediterranean Conference, pp. 952,957, Jun. 24-26, 2009.

* cited by examiner

STATIC OCCLUSION HANDLING USING DIRECTIONAL PIXEL REPLICATION IN REGULARIZED MOTION ENVIRONMENTS

CROSS REFERENCE TO RELATED PATENTS AND APPLICATIONS

U.S. Patent Publication No. 2015/0310274, filed Apr. 25, 2014, by Matthew Shreve et al., and entitled "METHOD AND SYSTEM FOR AUTOMATICALLY LOCATING STATIC OCCLUSIONS" is incorporated herein by reference in its entirety.

BACKGROUND

This disclosure provides a static occlusion handling method and system for use with appearance-based video tracking algorithms where static occlusions are present. The method and system assumes that the objects to be tracked move according to structured motion patterns within a scene, such as vehicles moving along a roadway. A primary concept is to replicate pixels associated with the tracked object from previous and current frames to current and future frames when the tracked object is occluded, partially or otherwise, by a semi-permanent object in the scene that hinders the view of the tracked object, where the predicted motion of the tracked object is a basis for replication of the pixels. In the context of this disclosure, the semi-permanent objects that interfere with a view of an object being tracked are termed 'static occlusions'.

Static occlusions present challenges in surveillance applications such as person and vehicle tracking. In most presently available tracking algorithms, a track is defined for an object and the position of the object is updated on a frame-by-frame basis by matching known features and/or blob characteristics of the object as it traverses an area of interest. Tracking is typically performed by finding the location of the best-matching features given a current feature representation of the object being tracked. This is usually performed via search/optimization algorithms across regions in subsequent frames nearby the location of the object in the current frame. When these features and blobs are occluded by other objects, the track can be lost since the appearance of the occluded object may not sufficiently match the appearance of the unoccluded object. Known methods to recover these "lost" tracks are not adequate for many applications.

A Kalman filter method uses linear prediction to estimate future object locations based on a past trajectory. See Azari, M.; Seyfi, A.; Rezaie, A. H., "Real Time Multiple Object Tracking and Occlusion Reasoning Using Adaptive Kalman Filters", Machine Vision and Image Processing (MVIP), 2011, 7th Iranian, pages 1-5, Nov. 16-17, 2011. However, a key drawback of the Kalman filter approach is the loss of the tracked object if the actual time the object is occluded differs from the filter prediction, e.g., when a car (tracked object) stops behind a tree (static occlusion). Other approaches analyze the dynamics of blob deformations, such as merging, splitting, shrinking, expanding, etc., that occur moments before the track is lost in order for it to potentially be recovered in future frames. See Jiyan Pan; Bo Hu, "Robust Occlusion Handling in Object Tracking", Computer Vision and Pattern Recognition, 2007, CVPR '07, IEEE Conference, pages 1-8, Jun. 17-22, 2007; and Gwo-Cheng Chao; Shyh-Kang Jeng; Shung-Shing Lee, "An improved occlusion handling for appearance-based tracking", Image Processing (ICIP), 2011 18th IEEE International Conference, pages 465-468, Sep. 11-14, 2011. Notably, these other approaches rely on computationally expensive search windows and morphological processing.

INCORPORATION BY REFERENCE

U.S. patent application Ser. No. 13/718,030, filed Dec. 18, 2012, by Bernal et al. and entitled "Computationally Efficient Motion Estimation with Learning Capabilities for Video Compression in Transportation and Regularized Environments"

U.S. patent application Ser. No. 14/195,036, filed Mar. 3, 2014, by Li et al., and entitled "Method and Apparatus for Processing Image of Scene of Interest";

U.S. patent application Ser. No. 14/171,022, filed Feb. 3, 2014, by Schweid et al., and entitled "Vehicle Detection Method and System Including Irrelevant Window Elimination and/or Window Score Degradation";

U.S. patent application Ser. No. 14/089,887, filed Nov. 26, 2013, by Bernal et al., and entitled "Method and System for Video-Based Vehicle Tracking Adaptable to Traffic Conditions";

U.S. patent application Ser. No. 14/078,765, filed Nov. 13, 2013, by Bernal et al., and entitled "System and Method for Using Apparent Size and Orientation of an Object to improve Video-Based Tracking in Regularized Environments";

U.S. patent application Ser. No. 14/068,503, filed Oct. 31, 2013, by Bulan et al., and entitled "Bus Lane Infraction Detection Method and System";

U.S. patent application Ser. No. 14/050,041, filed Oct. 9, 2013, by Bernal et al., and entitled "Video Based Method and System for Automated Side-by-Side Traffic Load Balancing";

U.S. patent application Ser. No. 14/017,360, filed Sep. 4, 2013, by Bernal et al. and entitled "Robust and Computationally Efficient Video-Based Object Tracking in Regularized Motion Environments";

U.S. Patent Application Publication No. 2014/0063263, published Mar. 6, 2014, by Bernal et al. and entitled "System and Method for Object Tracking and Timing Across Multiple Camera Views";

U.S. Patent Application Publication No. 2013/0278767, published Oct. 24, 2013, by Bernal et al., and entitled "Vehicle Counting Methods and Systems Utilizing Compressed Video Streams";

U.S. Patent Application Publication No. 2013/0106595, published May 2, 2013, by Loce et al., and entitled "Vehicle Reverse Detection Method and System via Video Acquisition and Processing";

U.S. Patent Application Publication No. 2013/0088600, published Apr. 11, 2013, by Wu et al., and entitled "Multi-Resolution Video Analysis and Key Feature Preserving Video Reduction Strategy for (Real-Time) Vehicle Tracking and Speed Enforcement Systems";

U.S. Patent Application Publication No. 2013/0076913, published Mar. 28, 2013, by Xu et al., and entitled "System and Method for Object Identification and Tracking";

U.S. Patent Application Publication No. 2013/0058523, published Mar. 7, 2013, by Wu et al., and entitled "Unsupervised Parameter Settings for Object Tracking Alorgithms";

U.S. Patent Application Publication No. 2009/0002489, published Jan. 1, 2009, by Yang et al., and entitled "Efficient Tracking Multiple Objects Through Occlusion";

Azari, M.; Seyfi, A.; Rezaie, A. H., "Real Time Multiple Object Tracking and Occlusion Reasoning Using Adaptive Kalman Filters", Machine Vision and Image Processing (MVIP), 2011, 7th Iranian, pages 1-5, Nov. 16-17, 2011;

Jiyan Pan; Bo Hu, "Robust Occlusion Handling in Object Tracking", Computer Vision and Pattern Recognition, 2007, CVPR '07, IEEE Conference, pages 1-8, Jun. 17-22, 2007;

Gwo-Cheng Chao; Shyh-Kang Jeng; Shung-Shing Lee, "An improved occlusion handling for appearance-based tracking", Image Processing (ICIP), 2011 18th IEEE International Conference, pages 465-468, Sep. 11-14, 2011;

Steven W. Smith, Ph.D., "Special Imaging Techniques", The Scientist and Engineer's Guide to Digital Signal Processing, chapter 25, pages 423-450, copyright 1997-2011 by California Technical Publishing;

"Kalman filter", Wikipedia, http://en.wikipedia.org/wiki/Kalman_filter, 26 pages, printed Mar. 7, 2014;

U. Castellani, S. Livatino, and R. Fisher, "Improving environment modelling by edge occlusion surface completion," International Symposium on 3D Data Processing Visualization and Transmission, 2002;

C. L. Zitnick and T. Kanade, "A cooperative algorithm for stereo matching and occlusion detection," Proc. IEEE Trans. Pattern Analysis and Machine Intelligence, volume 22, 2000;

D. L'evesque and F. Deschênes, "Detection of Occlusion Edges from the Derivatives of Weather Degraded Images," Proc. of the Second Canadian Conference on Computer and Robot Vision, pages 114-120, 2005;

J. Konrad and M. Ristivojevi. "Video segmentation and occlusion detection over multiple frames," IS&T/SPIE Symposium on Electronic Imaging, Image and Video Communications, 2003;

Jackson, B.; Bodor, R.; Papanikolopoulos, N., "Learning static occlusions from interactions with moving figures," Intelligent Robots and Systems, 2004. (IROS 2004). Proceedings. 2004 IEEE/RSJ International Conference, pages 963, 968 Vol. 1, 28 Sep.-2 Oct. 2004; and Miller, G.; Atev, S.; Papanikolopoulos, N., "Detecting static occlusion edges using foreground patterns," Control and Automation, 2009. MED '09. 17th Mediterranean Conference, pages 952, 957, 24-26 Jun. 2009, are incorporated herein by reference in their entirety.

BRIEF DESCRIPTION

In one embodiment of this disclosure, described is a computer-implemented method of tracking an object in a scene captured with an image capturing device configured to provide a frame including a plurality of pixels representative of the scene, the scene including an occlusion which occludes at least a portion of the tracked object as the tracked object travels along an approaching direction (D) associated with the scene, the method comprising: a) locating the occlusion and associated occlusion pixel positions within the frame including the scene; b) estimating the approaching direction (D) of the tracked object in the scene, relative to the located occlusion; and c) tracking the object in the scene, where pixels from a neighboring region along direction (D) in the frame are replicated to replace the occlusion pixels while all or part of the tracked object is occluded by the occlusion.

In another embodiment of this disclosure, described is an image processing system comprising: a controller configured to receive a digital image of a scene, the controller configured to execute instructions to perform a method of tracking an object in the scene captured with an image capturing device to provide a frame including a plurality of pixels representative of the scene, the scene including an occlusion which occludes at least a portion of the tracked object as the object travels along an approaching direction (D) associated with the scene, the method comprising: a) locating the occlusion and associated occlusion pixel positions within the frame including the scene; b) estimating the approaching direction (D) of the tracked object in the scene, relative to the located occlusion; and c) tracking the object in the scene, where pixels from a neighboring region along direction (D) in the frame are replicated to replace the occlusion pixels while all or part of the tracked object is occluded by the occlusion.

In still another embodiment of this disclosure, described is a computer program product comprising: a non-transitory computer-usable data carrier storing instructions that, when executed by a computer, cause the computer to perform a method of tracking an object in a scene captured with an image capturing device configured to provide a frame including a plurality of pixels representative of the scene, the scene including an occlusion which occludes at least a portion of the tracked object as the tracked object travels along an approaching direction (D) associated with the scene, the method comprising: a) locating the occlusion and associated occlusion pixel positions within the frame including the scene; b) estimating the approaching direction (D) of the tracked object in the scene, relative to the located occlusion; and c) tracking the object in the scene, where pixels from a neighboring region along direction (D) in the frame are replicated to replace the occlusion pixels while all or part of the tracked object is occluded by the occlusion.

DETAILED DESCRIPTION

This disclosure provides a static occlusion handling method and system for use with appearance-based video tracking algorithms where static occlusions are present. The method and system assumes that the objects to be tracked move according to structured motion patterns within a scene, such as vehicles moving along a roadway. A primary concept is to replicate pixels associated with the tracked object from previous and current frames to current and future frames when the tracked object is occluded, partially or otherwise, by a semi-permanent object in the scene that hinders the view of the tracked object, where the predicted motion of the tracked object is a basis for replication of the pixels. In the context of this disclosure, the semi-permanent objects that interfere with a view of an object being tracked are termed 'static occlusions'. Also, the term occlude and occluding object may also be used and similarly refer to semi-permanent objects that interfere with a view of an object being tracked. By replicating pixels, an object's features used for tracking, for example a color histogram, can continue to be tracked as the tracked object passes by the occlusion.

The methods and systems taught in the present disclosure are directed at mitigating the negative effects of occlusion on computer vision object tracking algorithms, thereby improving the robustness of object tracking. Examples of static occlusions include a tree or bush blocking the view of sections of a road, street or parking lot. The methods and systems handle these types of occlusions by initialization that comprehends an occlusion and tracking direction, then, applying a dynamic pixel replication algorithm. Initialization includes (1) automatically estimating, see U.S. Patent Publication No. 2015/0310274, filed Apr. 25, 2014, by Shreve et al. and entitled "Method and System for Automatically Locating Static Occlusions", or manually specifying the location of pixels corresponding to an occlusion(s); and, (2) determining a regular direction of the tracked object movement if the direction is not predetermined. Pixel replication onto a region of a video frame associated with an occlusion includes dynamically projecting pixels near the static occluder onto the occluder itself, where the tracked features of the moving object are replicated on the occluding object and hence the track is maintained. The direction from which the pixels are replicated is dependent on the trajectory of the object(s) being tracked. Both the trajectories and the static occlusions themselves can be learned either automatically using training data or manually from a priori knowledge. The image location from which the pixels are replicated can depend on the speed of motion of the object being tracked. The disclosed method and system is particularly suited for video-based monitoring of scenes with regularized motion patterns, e.g., roads, highways, sidewalks, etc., since individual objects which are tracked are typically constrained to motion along one or more predetermined paths.

While the disclosed method and system has general applicability to tracking objects within a scene which includes one or more occlusions, it is described below in the context of a vehicle tracking application, where one or more occlusions are present. This can include vehicle monitoring and tracking in parking lots and drive-thru lanes where occlusions such as trees, signs, lampposts can often obstruct a camera view onto regions of a scene, causing failures in a tracking algorithm(s). Other potential static occlusions include blind spots in a camera (caused by e.g., faulty pixels in a camera sensor, a camera hood, glare from an external light source).

As briefly discussed in the Background section, object tracking is a core technology of many algorithms used for surveillance. Typically, an object tracker consists of the following steps: 1) detect a foreground object or an object in motion and produce a binary mask with blobs indicating the presence of the detected object; 2) analyze blobs to determine if they match the characteristics, e.g., size, shape, orientation, etc., of the object that needs to be tracked; and 3) for each blob that is determined to be of interest, features are extracted from the image region indexed by the blob and then used to re-detect it in future frames. This step can vary in difficulty depending on the complexity of the scene as well as the object itself.

Foreground object detection in step 1 can be performed, for example, by maintaining an estimate of the background and by comparing each incoming frame with that estimate, where pixels that are significantly different from the estimated background can be considered foreground pixels. Alternatively, objects in motion can be detected in step 1 by performing frame differencing, where consecutive frames are compared for significant differences among them. Pixels where large differences are found likely contain portions of the scene where motion is present between the frames in question. Other object detection algorithms can alternatively be applied, such as computer vision approaches that detect objects of a particular nature, e.g., vehicles, pedestrians, in a still image or video frame.

The occlusion handling method and system disclosed herein assists the last stage of the algorithm, i.e., to provide a method for increasing the robustness of tracking algorithms that use visual features or blobs in the tracking process.

Static occlusions present challenges in many surveillance applications such as person and vehicle tracking. In most tracking algorithms, a track is defined for an object and the position is updated on a frame-by-frame basis, or at lower rates, by matching features and/or blob characteristics of the object as it traverses the area of interest. Tracking is typically performed by finding the location of the best-matching features given a current feature representation of the object being tracked. This is usually performed via search/optimization algorithms across regions in subsequent frames nearby the location of the object in the current frame. When these features and blobs are occluded by other objects, e.g., trees, posts, etc., the track can be lost since the appearance of the occluded object may not sufficiently match the appearance of the unoccluded object. One key drawback of the current approach, including a linear predictor such as a Kalman filter, is losing the tracked object if the actual time the object is occluded differs from the filter prediction, e.g., when a car (tracked object) stops behind a tree (static occlusion). As will be described below, one example of an exemplary embodiment of an occlusion handling algorithm disclosed herein does not rely on a prediction, and therefore, does not have this limitation. Other current approaches analyze the dynamics of blob deformations, such as merging, splitting, shrinking, expanding, etc., that occur moments before the track is lost in order for it to potentially be recovered in future frames. However, these approaches rely on computationally expensive search windows and morphological processing, which is avoided by the disclosed occlusion handling method(s) and system(s) provided herein.

Figure 1:
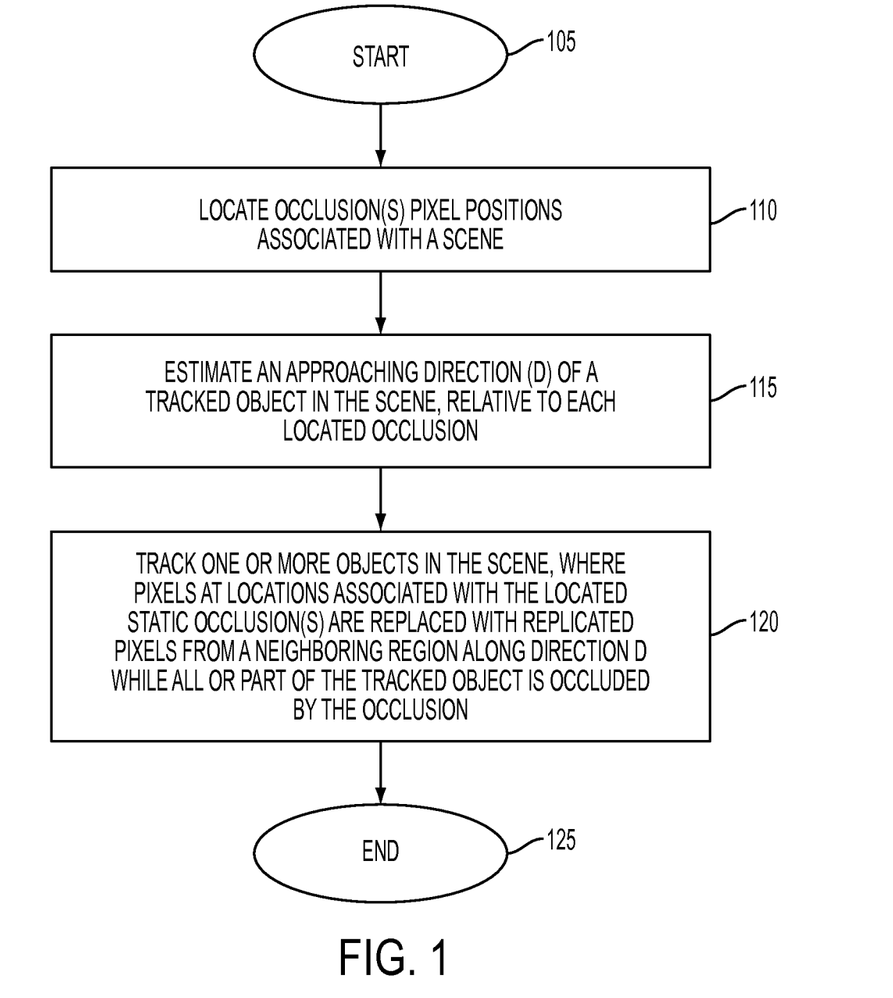
FIG. 1 is a flow chart of a method of tracking an object in a scene including pixel replication to handle occlusions according to an exemplary embodiment of this disclosure.

The algorithm associated with the occlusion handling method(s) and system(s) disclosed herein generally operates by replacing the texture of an occluding object with the texture of the object being tracked. The algorithm includes three primary steps as shown in FIG. 1, in addition to a start step 105 and end step 125:

Locating static occlusions 110. Determine if and where the static, i.e., permanent and semi-permanent, occluding objects are in the scene, either automatically or a priori. The output of this step is a label associated with each pixel, selected pixels, or groups of pixels associated with the field of view (FOV) of the image capturing device indicating if a particular pixel is a part of a static occlusion or background, see FIG. 2. U.S. Patent Publication No. 2015/0310274, filed Apr. 25, 2014, by Shreve et al. and entitled "Method and System for Automatically Locating Static Occlusions".

2) Estimating the direction of replication 115. Determine from which direction (D) the object(s) being tracked approaches, and from which direction it may be hidden/or partially hidden by each occlusion. Three possible approaches are described herein for estimating D.

The first approach determines the approaching direction of the tracked objects by using a priori knowledge of the scene. The second approach uses computer vision algorithms such as optical flow or other motion estimation techniques to automatically learn the approaching direction of the tracked objects. Note that for both of these approaches, the direction D is determined for each static occlusion in the scene and is therefore fixed during tracking. A third approach is a dynamically adaptive alternative to determine D, where the trajectory of each tracked object is used to dynamically update D before each object becomes occluded, where the direction is estimated during run-time from the tracking information. In addition, other computer vision algorithms such as optical flow or other motion estimation techniques could be used to dynamically update D during run-time.

The input to step 2 includes the labeled pixels from step 1, and the output of step 2 includes a direction D associated with each static occlusion.

3) Replication of pixels 120. Replicate pixels included in a neighboring region, relative to the occlusion, along direction D, where pixels associated with the occluding object are replaced with the neighboring region pixels. Four different approaches for replicating the neighboring region are described herein.

The first approach replicates the neighboring region pixels based on shifted line segments oriented in the D direction. The second approach replicates neighboring pixels that are covered by an area of the entire shape of the occluded object being shifted in the D direction. A third and fourth approach both use a known appearance of the tracked object, where the third approach replicates the tracked object based on the points of intersection with the occlusion, and the fourth approach uses the tracked object's trajectory.

In another embodiment, the pixels of the static occlusion can be replaced with pixels taken from a previous frame in the video, but at the same locations given in approaches 1 and 2. For instance, a fixed time delay may be used that always replicates pixels from a given region of a frame at a fixed time interval in the past. This approach would be desirable in situations where the objects being tracked are expected to move at a somewhat constant speed (e.g., vehicles on a highway). Alternatively, replication can be performed with a variable delay which can be determined from an estimated speed of the object being tracked such that pixels from a prior frame are replicated onto the region of the current frame associated with the occlusion. For instance, if an object is moving at 10 pixels per frame, then it is possible to know when the object is likely to be contained in the replicated region of the image, and so the delay can be set accordingly.

In the case of approaches 3 and 4, it is possible to predict the frame when the tracked object will be occluded by the static occlusion when using the tracked objects speed to estimate its future positions in the frame. Hence, in one embodiment, the known appearance of the tracked object can be used to replace the pixels on the static occlusions based on its predicted time of intersection or overlap with the static occlusion.

In any of these approaches, the pixels used for replication may come from one or more cameras that are networked. For example, in the first and second approaches, if a static occlusion is occluding a tracked object in one view but is not occluding the same tracked object in a second camera view, then the pixels corresponding to the object in the second view may be replicated onto the static occlusion in the first view. In this scenario, the known appearance of the object that is used in the third and fourth approaches may come from one or more cameras. In one embodiment, the pixels that are selected from a second view in order to be replicated onto the first view may come from a calibrated camera network where a coordinate transform that maps pixel coordinates from one camera to any other camera is known. Based on the direction D of the tracked object, the pixels that are replicated will consist of the pixels of the objects shape shifted, translated, scaled, skewed, and in general, undergoing geometric correction (e.g., perspective, projective, homographic, etc.) to the second camera view, the geometric correction being associated with this coordinate transform.

The input to step 3 is the direction D from step 2, and the output of step 3 is a new image that contains replicated pixels from adjacent areas associated with an occlusion of the current frame, or from stored images, i.e., previous images, of the tracked object.

Figure 2:
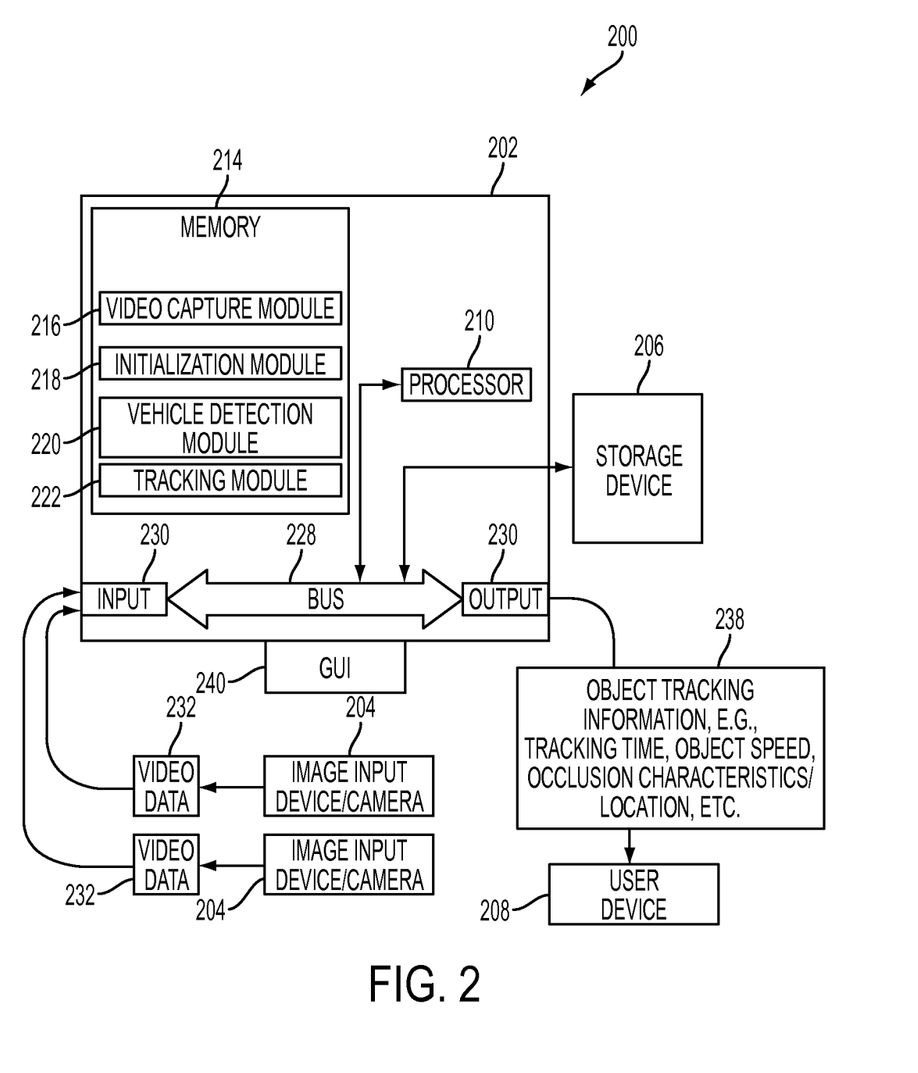
FIG. 2 is a block diagram of an object tracking system including pixel replication to handle occlusions according to an exemplary embodiment of this disclosure.

FIG. 2 is a schematic illustration of an object tracking system 200 according to one exemplary embodiment, the system including a vehicle tracking system as described herein. The system includes a tracking device 202, an image capture device 204, and a storage device 206, which may be linked together by communication links, referred to herein as a network. In one embodiment, the system 200 may be in further communication with a user device 208. These components are described in greater detail below.

The tracking device 202 illustrated in FIG. 2 includes a controller that is part of or associated with the tracking device 202. The exemplary controller is adapted for controlling an analysis of video data received by the system 200. The controller includes a processor 210, which controls the overall operation of the tracking device 202 by execution of processing instructions that are stored in memory 214 connected to the processor 210.

The memory 214 may represent any type of tangible computer readable medium such as random access memory (RAM), read only memory (ROM), magnetic disk or tape, optical disk, flash memory, or holographic memory. In one embodiment, the memory 214 comprises a combination of random access memory and read only memory. The digital processor 210 can be variously embodied, such as by a single core processor, a dual core processor (or more generally by a multiple core processor), a digital processor and cooperating math coprocessor, a digital controller, or the like. The digital processor, in addition to controlling the operation of the tracking device 202, executes instructions stored in memory 214 for performing the parts of a method discussed herein. In some embodiments, the processor 210 and memory 214 may be combined in a single chip.

The tracking device 202 may be embodied in a networked device, such as the image capture device 204, although it is also contemplated that the tracking device 202 may be located elsewhere on a network to which the system 200 is connected, such as on a central server, a networked computer, or the like, or distributed throughout the network or otherwise accessible thereto. The video data analysis (i.e., object detection) phases disclosed herein are performed by the processor 210 according to the instructions contained in the memory 214. In particular, the memory 214 stores a video capture module 216, which captures video data of an object tracking area of interest; an initialization module 218, which initializes the system; and a vehicle detection module 220, which detects vehicles, that are in the area of interest; a tracking module 222, which tracks an object in the area of interest. Embodiments are contemplated wherein these instructions can be stored in a single module or as multiple modules embodied in the different devices.

The software modules as used herein, are intended to encompass any collection or set of instructions executable by the tracking device 202 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the tracking device 202 may be all connected by a bus 228.

With continued reference to FIG. 2, the tracking device 202 also includes one or more communication interfaces 230, such as network interfaces, for communicating with external devices. The communication interfaces 230 may include, for example, a modem, a router, a cable, and and/or Ethernet port, etc. The communication interfaces 230 are adapted to receive video and/or image data 232 as input.

The tracking device 202 may include one or more special purpose or general purpose computing devices, such as a server computer or any other computing device capable of executing instructions for performing the exemplary method.

FIG. 2 further illustrates the tracking device 202 connected to an image source 204 for inputting and/or receiving the video data and/or image data (hereinafter collectively referred to as "video data") in electronic format. The image source 204 may include an image capture device, such as a camera. The image source 204 can include one or more surveillance cameras that capture video data from the object tracking area of interest. For performing the method at night in areas without external sources of illumination, the cameras 204 can include near infrared (NIR) capabilities at the low-end portion of a near-infrared spectrum (700 nm-1000 nm).

In one embodiment, the image source 204 can be a device adapted to relay and/or transmit the video captured by the camera to the tracking device 202. For example, the image source 204 can include a scanner, a computer, or the like. In another embodiment, the video data 232 may be input from any suitable source, such as a workstation, a database, a memory storage device, such as a disk, or the like. The image source 204 is in communication with the controller containing the processor 210 and memories 214.

With continued reference to FIG. 2, the system 200 includes a storage device 206 that is part of or in communication with the tracking device 202. In a contemplated embodiment, the tracking device 202 can be in communication with a server (not shown) that includes a processing device and memory, such as storage device 206.

With continued reference to FIG. 2, the video data 232 undergoes processing by the tracking device 202 to output object tracking information 238 regarding one or more objects tracked to an operator in a suitable form on a graphic user interface (GUI) 240 or to a user device 208, such as a smart phone, that is in communication with the tracking device 202. The GUI 240 can include a display, for displaying information, such as vehicle tracking time, to users, and a user input device, such as a keyboard or touch or writable screen, for receiving instructions as input, and/or a cursor control device, such as a mouse, trackball, or the like, for communicating user input information and command selections to the processor 210.

Figure 3:
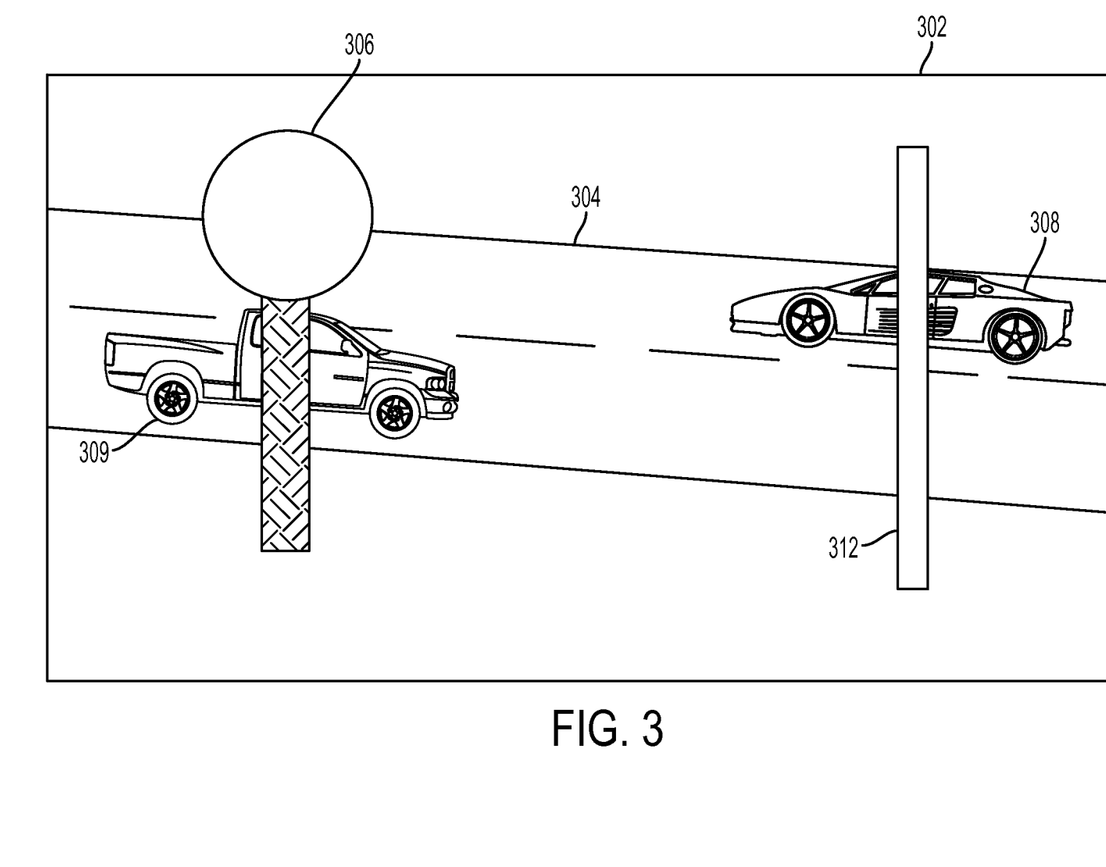
FIG. 3 is an example of an unmodified image frame including a captured scene where an occlusion is present.
Figure 4:
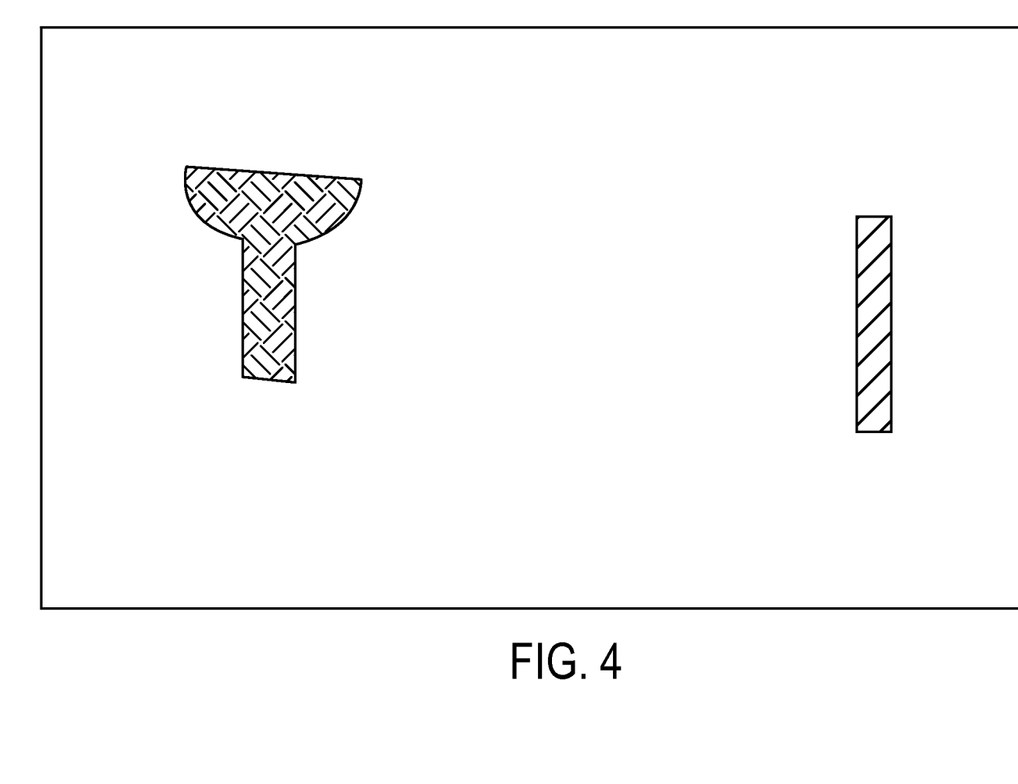
FIG. 4 shows the manual detection of the occlusions present in the scene illustrated in FIG. 1, according to an exemplary embodiment of this disclosure.
Figure 5:
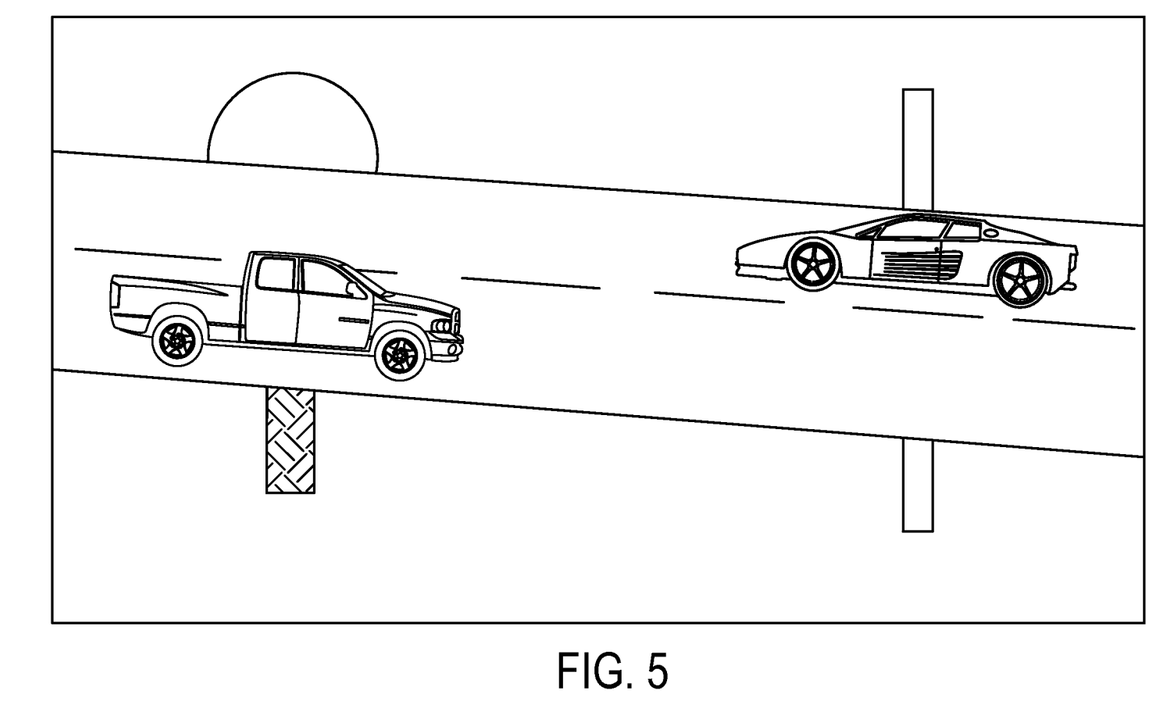
FIG. 5 shows a modified image frame after pixel replication is performed to remove the occlusions detected as shown in FIG. 2, according to an exemplary embodiment of this disclosure.

FIG. 3-FIG. 5 illustrate an example of an exemplary embodiment of an occlusion handling method and system including pixel replication as described herein, where FIG. 3 shows an unmodified image frame 302 including two vehicles 308 and 309, a vehicle path, i.e., road 304, a tree occlusion 306 and a pole occlusion 312. FIG. 4 shows manually marked static occlusions, and FIG. 5 shows a modified frame after pixel replication processing to remove an occlusion(s).

Various aspects of the method and system are now described in greater detail below.

1) Locating Static Occlusions 110.

Static occlusions in a scene can be located either manually or automatically. In the manual approach, the user defines regions by specifying the outline of static occlusions in the scene as shown in FIG. 4. Alternatively, an automatically tracked blob-based approach can be used that monitors changes in a blob along its trajectory, and uses the changes to estimate the occlusion. This approach monitors the width of the tracked blobs to determine patterns that indicate that objects are consistently being occluded within a region of the scene. See U.S. Patent Publication No. 2015/0310274, filed Apr. 25, 2014, by Shreve et al. and entitled "Method and System for Automatically Locating Static Occlusions".

An example of an automatic blob-based approach to identifying static occlusions is determining a foreground pixel is never activated in a region of an image of a scene after performing foreground segmentation for several hours. A binary mask is created, with ON pixels being indicative of static occlusions. Locating the static occlusions may be an offline process performed only when required, for example after camera installation or after camera reconfiguration. See U.S. Patent Publication No. 2015/0310274, filed Apr. 25, 2014, by Shreve et al. and entitled "Method and System for Automatically Locating Static Occlusions".

For example, according to an exemplary embodiment, static occlusions can be located as follows:
 1) Initialize a foreground accumulator array;
 2) Segment/identify foreground or objects in motion from multiple image frames;
 3) Update accumulator array with identified foreground information;
 4) Repeat the foreground identification and accumulation steps for a sequence/collection of image frames;
 5) Create static occlusion mask from the accumulator array by analyzing likely trajectories through the image that do not appear in the foreground; and
 6) Label static occlusions based on the occlusion mask.

2) Estimating a Direction of Replication 115.

In order to learn a direction of replication, there are three approaches further described below:

i) A priori knowledge such as the general direction of the vehicles/pedestrians is known, such as shown in FIG. 3, where a directional input is chosen for each occluding object. This may be a manual process where an operator manually inputs directions of replication associated with each occluder in the scene.

ii) Motion is calculated, using methods such as optical flow, across several hours of video in regions surrounding each occluded region associated with a scene to develop a consensus on the optimal direction. This can be a semi-manual approach whereby analysis of motion is performed automatically, and determination of predominant directions of replication is done manually. Alternatively, it can be a fully automated approach whereby the predominant direction of replication is determined by a learning algorithm that analyzes the available motion data, as disclosed in U.S. patent application Ser. No. 13/718,030, filed Dec. 18, 2012, by Bernal et al. and entitled "Computationally Efficient Motion Estimation with Learning Capabilities for Video Compression in Transportation and Regularized Environments".

iii) In conditions where a single direction is not optimal, such as when there are multiple valid directions from which objects can be occluded, a dynamic approach may be used that adjusts the direction of replication depending on the motion vector of the object being occluded and its location relative to the occluder. This is a fully automated approach.

Approach (i) and (ii) are offline processes, performed once at setup, or every time camera configuration or patterns of motion in the scene change. Approach (iii) is an online process completed for each incoming video frame where tracing information of objects being tracked that approach the vicinity of the occluder is used to determine a direction of replication.

3) Replication of Pixels 120.

Figure 6:
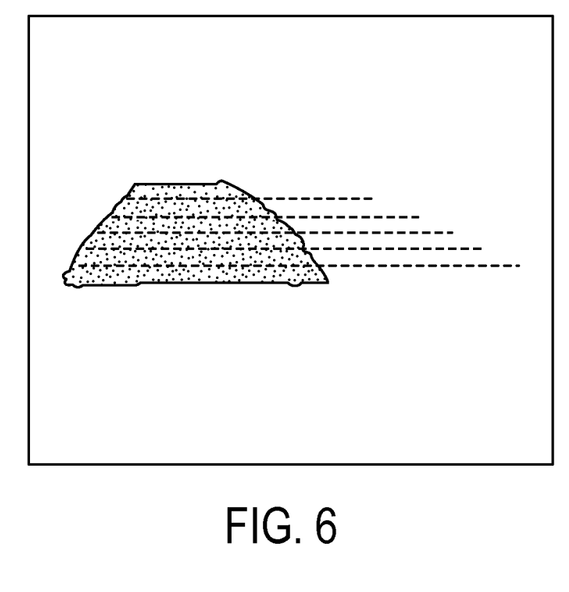
FIG. 6 is an example of boundary type pixel replication including occluder pixel replacement with pixels adjacent to the occluder along a zero degree line associated with the direction/path of a tracked object, according to an exemplary embodiment of this disclosure.
Figure 7:
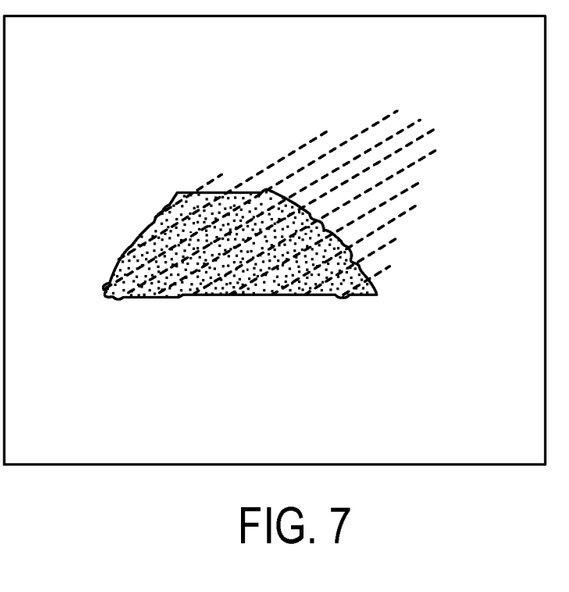
FIG. 7 is an example of boundary type pixel replication including occluder pixel replacement with pixels adjacent to the occluder along a 45 degree line associated with the direction/path of a tracked object, according to an exemplary embodiment of this disclosure.

3a) After the direction from which to replicate pixels is determined, the region associated with the occluding object is divided into line segments that are oriented along the determined direction, as illustrated in FIGS. 6 and 7 where the occluding object is shown in solid and the path of a tracked vehicle is shown as indicated by the orientation of the line segments. As shown in these figures, the object is coming straight from the right (FIG. 6) or at an angle (FIG. 7). This is an online process, where for each incoming video frame, the pixels associated with occlusions, as indicated by the mask generated in step 1, are replaced by pixel portions in the video frame adjacent to the occluder along the incoming direction of the object being tracked, as indicated by the output of step 2. This pixel replication process results in the occluder object taking on an appearance of the region immediately adjacent to the occluder object in the direction of the object being tracked as shown in FIG. 5. Replication of these pixels is beneficial to feature-based trackers because features, i.e., pixels, of the object being tracked that would otherwise be occluded, are replicated at the location of the occluder.

Figure 8:
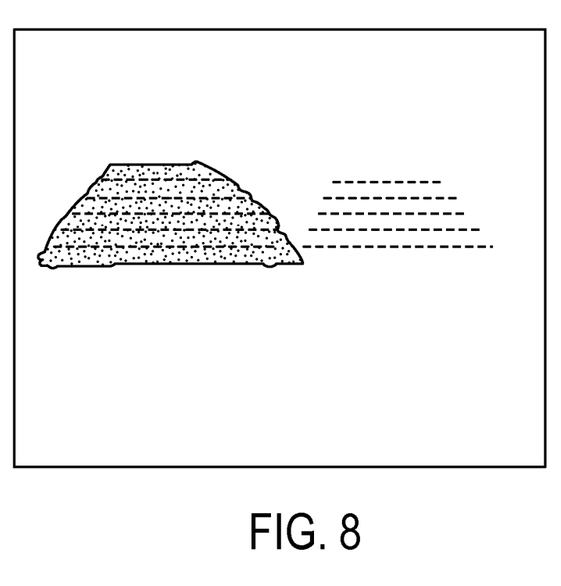
FIG. 8 is an example of occluder shape type pixel replication including occluder pixel replacement with pixels adjacent to the occluder along a zero degree line associated with the direction/path of a tracked object, according to an exemplary embodiment of this disclosure.
Figure 9:
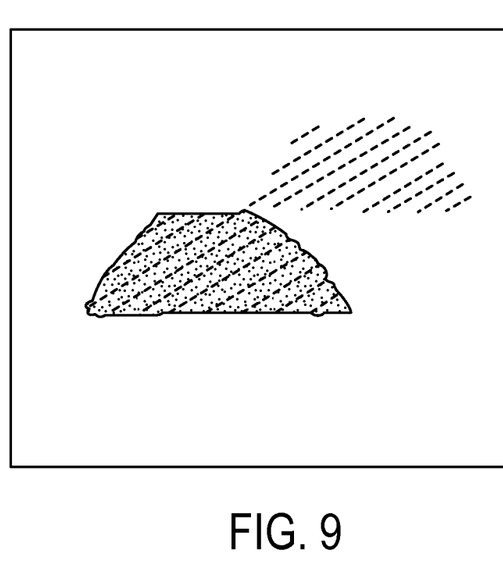
FIG. 9 is an example of occluder shape type pixel replication including occluder pixel replacement with pixels adjacent to the occluder along a 45 degree line associated with the direction/path of a tracked object, according to an exemplary embodiment of this disclosure.

Alternatively, step 3 can also be implemented the following ways:

3b) In contrast to replicating based on the boundary of an object as shown and described with reference to FIGS. 6 and 7, it is also possible to replicate using a shift (i.e., translation) of the occluding object shape. Pixels are replicated from the tracked object and its surround in the shape of the shifted occluding object in the chosen as shown in FIGS. 8 and 9. Notably, the performance of this alternative approach is highly dependent on the shape of the occlusion. For instance, when replicating the tree shown in FIG. 3, a complete translational shift of the object may create too large a gap between the top right and bottom right of the tree. On the other hand, cases where an object is more rectangular, such as a pole, performance can be potentially boosted relative to a boundary type approach.

Figure 10:
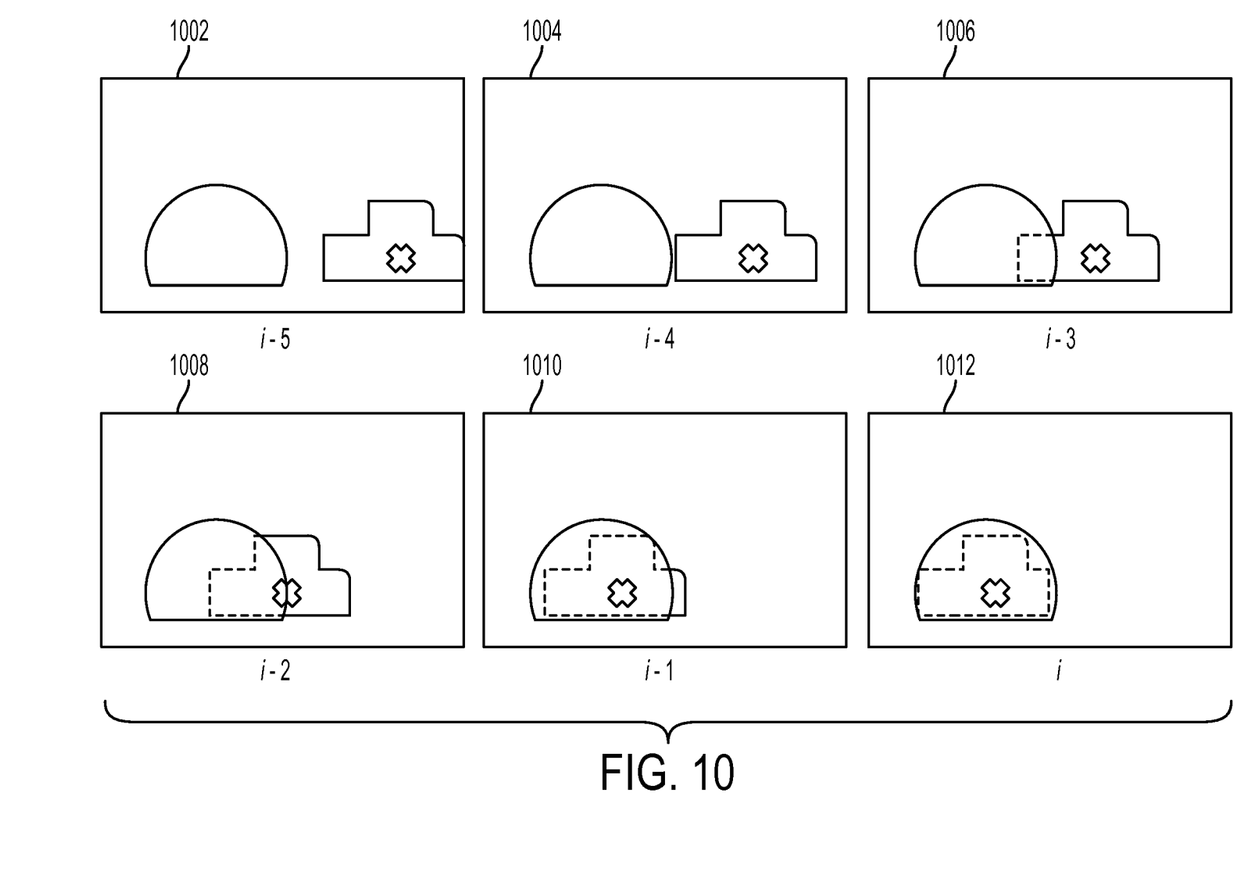
FIG. 10 is an example of pixel prediction and replication based on the motion history of a tracked object according to an exemplary embodiment of this disclosure.

3c) Predict when an object will be occluded by using the motion history of the tracked object, and then replicate the pixels of the tracked object onto the occlusion where an intersection occurs. This is a relatively more sophisticated, and general, approach as compared to approach 3a and 3b because pixel replication in this case may take place between different frames. Specifically, if the index of the current frame is denoted as i and the index from which the pixels are being replicated is denoted as i–k, then 3a and 3b are specific cases of 3c when k=0, as illustrated in FIG. 10. Notably, k may be chosen such that i–k indexes the most recent frame in which the tracked object was not occluded. The pixel locations associated with the replication of occluded areas of the tracked object in the current frame can be predicted via, for example, Kalman filtering the historic trajectory data of the tracked object to estimate a location of the tracked object behind the occluder. In FIG. 10, the crosses shown in the "i–5" 1002 and "i–4" 1004 frames indicate tracked locations, while the crosses shown in "i–3" 1006, "i–2" 1008, "i–1" 1010 and "i" 1012 frame indicate predicted locations. This assumes that tracking is less robust than prediction when occlusion occurs, although a mix of tracking and prediction can potentially be used in cases of partial occlusion as shown in frames i–3 through i–1 in FIG. 10.

According to one exemplary embodiment, k can be set to 1 for frame i–1; k can be set to 2, for frame i–2; and so on. For every frame for which occlusion occurs, i.e., frames i–3 through i, the occluded areas inside the dotted lines can be replicated from frame i–2. In more general applications of occlusion handling, different portions of the occluded object can be replicated from different frames.

Note that the prediction/replication operation is performed until the predicted location of the object reaches the exit boundary of the occluder as shown in frame i of FIG. 10, in which case the location prediction updates can stop, and the pixel replication process can be repeated until the tracked object is detected to exiting the occluded area of the frame. Some benefits associated with this alternative is that the number of pixels that are replicated can potentially be larger than that using the 3a approach since the full object can be used and moved at the same velocity across the occluding object. If the tracked object stops behind the occlusion, then the replicated pixels stay near the occluding object's boundary, and then moved off when the tracked object is detected to pass through.

Note: 3b and 3c have the advantage of approximately preserving the appearance of the tracked object after replication occurs. In other words, the object won't warp according to the shape of the boundary of the occluder as is the case with 3a.

Notably, one limitation of the 3a and 3b approach is that the length of the static occlusion across the direction of motion of the object being tracked cannot be larger than the length of the object along that same direction. Otherwise, there will not be enough pixels from the occluded object that can be replicated when it gets fully occluded in order for the object tracker to detect the tracked object as it begins to move past the occluder. This limitation does not apply when the pixel replication is applied in a predictive manner as described in 3c.

Some attributes associated with the occlusion handling methods and systems including pixel replication as described herein include one or more of the following:

- The algorithm is adaptable to multiple types and shapes of static occlusions.
- It can be suited to an object tracker that uses appearance-based features including template matching, and corner-, texture-, color-, or edge-based trackers.
- The method can handle static occlusions via image preprocessing without increasing the complexity of the object tracker.
- The manual approach can require one simple setup phase, i.e., define occluding regions, and potentially predominant directions of pixel replication.
- The method includes linear complexity, i.e., O(n) for each frame, where n is the number of pixels for all occluding regions.
- The computational complexity of the disclosed method remains the same across frames, and the replication is performed once per frame. In the case of traffic following in one direction, provided is a relatively computationally inexpensive approach compared to other methods. Other occlusion handling methods often require increasing search neighborhoods or more fine-grained blob processing and classification which is computationally expensive.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of tracking an object in a scene captured with an image capturing device configured to provide a first frame including a plurality of pixels representative of the scene, the scene including an occlusion which occludes at least a portion of the tracked object as the tracked object travels along an approaching direction (D) associated with the scene, the method comprising:
   a) locating the occlusion and associated occlusion pixel positions within the first frame including the scene;
   b) estimating the approaching direction (D) of the tracked object in the scene, relative to the located occlusion;
   c) identifying a neighboring region along direction (D) located adjacent to the occlusion pixel positions;

d) replicating pixels associated with the neighboring region; and
e) replacing pixels in a second frame located at the associated occlusion pixel positions with the replicated pixels, wherein all or part of the tracked object is occluded by the occlusion in the second frame.

2. The computer-implemented method of tracking an object in a scene according to claim 1, wherein the occlusion is a static occlusion.

3. The computer-implemented method of tracking an object in a scene according to claim 1, wherein at least a first and second image capturing devices are used to track one or more objects.

4. The method of claim 3, wherein pixels from the second frame acquired with the second image capturing device are replicated onto the first frame acquired with the first image capturing device.

5. The method of claim 4, wherein a geometric correction is applied prior to the pixel replication.

6. The computer-implemented method of tracking an object in a scene according to claim 1, wherein the second frame is a prior frame.

7. The computer-implemented method of tracking an object in a scene according to claim 1, wherein the second frame is the same as the first frame.

8. The method of claim 4, wherein the pixels that are replaced in the first frame are replicated from a prior frame based on at least one of the speed of the tracked object.

9. The computer-implemented method of tracking an object in a scene according to claim 1, wherein estimating the approaching direction (D) includes the use of one or more of:
   a priori knowledge of the occlusion; and
   motion analysis in regions nearby an occlusion.

10. The computer-implemented method of tracking an object in a scene according to claim 1, wherein pixels are replicated in step d) performing one of:
    shifting line segments oriented in the D direction;
    replicating the tracked object pixels associated with an area of the occlusion shifted in the D direction;
    replicating the tracked object pixels based on an intersection of the tracked object and the occlusion; and
    replicating the tracked object pixels based on a trajectory associated with the tracked object.

11. The computer-implemented method of tracking an object according to claim 1, wherein step d) performs pixel replication using one or both of a current frame and a stored image of the tracked object.

12. An image processing system for tracking an object, the system comprising:
    a processor; and,
    a non-transitory computer readable memory storing instructions that are executable by the processor to:
    a) receive a digital image of a scene captured with an image capturing device, the digital image including a plurality of pixels representative of the scene, the scene including an occlusion which occludes at least a portion of the tracked object as the object travels along an approaching direction (D) associated with the scene;
    b) locate the occlusion and associated occlusion pixel positions within a first frame including the scene;
    c) estimate the approaching direction (D) of the tracked object in the scene, relative to the located occlusion;
    d) identify a neighboring region along direction (D) located adjacent to the occlusion pixel positions;
    e) replicate pixels associated with the neighboring region; and
    f) replace pixels in a second frame located at the associated occlusion pixel positions with the replicated pixels, wherein all or part of the tracked object is occluded by the occlusion in the second frame.

13. The image processing system according to claim 12, wherein the occlusion is a static occlusion.

14. The image processing system according to claim 12, wherein at least a first and second image capturing devices are used to track one or more objects.

15. The image processing system according to claim 14, wherein pixels from the second frame acquired with the second image capturing device are replicated onto the first frame acquired with the first image capturing device.

16. The image processing system according to claim 14, wherein a geometric correction is applied prior to the pixel replication.

17. The image processing system according to claim 12, wherein the second frame is a prior frame.

18. The image processing system according to claim 12, wherein the second frame is the same as the first frame.

19. The image processing system according to claim 12, wherein the pixels that are replaced in the first frame are replicated from a prior frame based on the speed of the tracked object.

20. The image processing system according to claim 12, wherein estimating the approaching direction (D) includes the use of one or more of:
    a priori knowledge of the occlusion; and
    motion analysis in regions nearby an occlusion.

21. The image processing system according to claim 12, wherein pixels are replicated in step e) performing one of:
    shifting line segments oriented in the D direction;
    replicating the tracked object pixels associated with an area of the occlusion shifted in the D direction;
    replicating the tracked object pixels based on an intersection of the tracked object and the occlusion; and
    replicating the tracked object pixels based on a trajectory associated with the tracked object.

22. The image processing system according to claim 12, wherein step e) performs pixel replication using one or both of a current frame and a stored image of the tracked object.

23. A computer program product comprising:
    a non-transitory computer-usable data carrier storing instructions that, when executed by a computer, cause the computer to perform a method of tracking an object in a scene captured with an image capturing device configured to provide a first frame including a plurality of pixels representative of the scene, the scene including an occlusion which occludes at least a portion of the tracked object as the tracked object travels along an approaching direction (D) associated with the scene, the method comprising:
    a) locating the occlusion and associated occlusion pixel positions within the frame including the scene;
    b) estimating the approaching direction (D) of the tracked object in the scene, relative to the located occlusion; and
    c) identifying a neighboring region along direction (D) located adjacent to the occlusion pixel positions;
    d) replicating pixels associated with the neighboring region; and
    e) replacing pixels in a second frame located at the associated occlusion pixel positions with the replicated pixels, wherein all or part of the tracked object is occluded by the occlusion in the second frame.

24. The computer program product according to claim 23, wherein estimating the approaching direction (D) includes the use of one or more of:
- a priori knowledge of the occlusion; and
- motion analysis in regions nearby an occlusion.

25. The computer program product according to claim 23, wherein pixels are replicated in step d) performing one of:
- shifting line segments oriented in the D direction;
- replicating the tracked object pixels associated with an area of the occlusion shifted in the D direction;
- replicating the tracked object pixels based on an intersection of the tracked object and the occlusion; and
- replicating the tracked object pixels based on a trajectory associated with the tracked object.

* * * * *